(12) United States Patent
Birnbaum et al.

(10) Patent No.: US 7,991,682 B1
(45) Date of Patent: Aug. 2, 2011

(54) CROSS TRADING SECURITIES DURING TIME WINDOWS AT THE VOLUME WEIGHTED AVERAGE PRICE

(75) Inventors: Samuel Ayzyk Birnbaum, Oceanside, NY (US); Cristian Zarcu, Mahwah, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 139 days.

(21) Appl. No.: 11/706,441

(22) Filed: Feb. 14, 2007

(51) Int. Cl.
*G06Q 40/00* (2006.01)
(52) U.S. Cl. ............... 705/37; 705/35; 705/36 R
(58) Field of Classification Search ........... 705/1, 35, 705/36 R, 37, 38, 39
See application file for complete search history.

(56) References Cited

U.S. PATENT DOCUMENTS

| | | | | |
|---|---|---|---|---|
| 2002/0082967 | A1* | 6/2002 | Kaminsky et al. | 705/37 |
| 2003/0177126 | A1* | 9/2003 | Weingard et al. | 707/10 |
| 2004/0236636 | A1* | 11/2004 | Lutnick et al. | 705/26 |
| 2005/0222936 | A1* | 10/2005 | Panariti et al. | 705/37 |
| 2006/0059078 | A1* | 3/2006 | Courbois et al. | 705/37 |
| 2006/0085312 | A1* | 4/2006 | Griffin et al. | 705/35 |

FOREIGN PATENT DOCUMENTS

WO WO 01/084419 A1 11/2001

OTHER PUBLICATIONS

§ Christopher Ting. (2006). Which Daily Price is Less Noisy? Financial Management, 35(3), 81-95, from ABI/INFORM Global. (Document ID 1155160071).*
§ Michael Geismar, President, Quantitative Investment Management. (Mar. 1986). Wall Street Computer Review, 3(6), 40, from ABI/INFORM Global. (Document ID: 1375822361).*
U.S. Appl. No. 12/353,671, filed Jan. 14, 2009.
U.S. Appl. No. 12/353,675, filed Jan. 14, 2009.
U.S. Appl. No. 11/900,163, filed Sep. 10, 2007.
Gomber et al., "Flexible VWAP Executions in Electronic Trading", presented at the 2008 European Conference of the Financial Management Association International, Jun. 4-6, 2008, 12 pages.

* cited by examiner

*Primary Examiner* — Alexander Kalinowski
*Assistant Examiner* — Abhishek Vyas
(74) *Attorney, Agent, or Firm* — Stephen C. Glazier; K&L Gates LLP

(57) ABSTRACT

Embodiments of a system and method for cross trading a publicly traded security are disclosed. In an embodiment, a cross trade is executed at the volume weighted average price of the publicly traded security calculated for a portion of the trading day. An embodiment of the method includes accepting offers to buy and sell the security during a first window of time, calculating the volume weighted average price of the security during a second window of time, and cross trading the offers. An embodiment of the system includes a user interface for accepting offers, a volume weighted average price calculator for calculating the volume weighted average price at which to execute the cross trade and a cross trade application for executing the cross trade.

14 Claims, 5 Drawing Sheets

CROSS TRADING SECURITIES DURING TIME WINDOWS AT THE VOLUME WEIGHTED AVERAGE PRICE

FIELD OF THE INVENTION

Embodiments of the invention generally relate to cross trading securities. Particular embodiments of the invention relate to methods and systems for cross trading securities at the volume weighted average price calculated during a portion of the trading day.

BACKGROUND OF THE INVENTION

Institutional investors are reluctant to buy or sell large quantities of a security because simply offering to buy or sell a large quantity of a security affects the price. For example, if a hedge fund offers to sell 100,000 shares of stock in IBM, the price of the stock will drop because of an increase in supply. This problem is exacerbated when other investors see that the hedge fund is selling 100,000 shares of IBM, and they interpret that offer as a signal that the hedge fund's managers expect the stock price to fall. Consequently, these other investors may also try to sell their shares in IBM based on their interpretation of the hedge fund's motivation in making the offer. This results in a further increase in supply that pushes the stock price even lower. By the time the hedge fund successfully sells all 100,000 shares, the price may be significantly lower than when the initial offer was made. As a result, the shares of IBM that the hedge fund still holds may be reduced in value. In effect, the market's interpretation of the hedge fund's motivation becomes a self-fulfilling prophecy. Consequently, the liquidity of the hedge fund's investments is inhibited and its ability to profitably manage its portfolio is diminished.

In order to avoid these consequences, an investor can request that his broker try to arrange a cross trade at the all-day volume weighted average price ("all-day VWAP"). If the broker can find someone to accept the investor's all-day VWAP cross trade offer, both parties lock into the trade before the market opens. When the market closes for the day, the broker calculates the all-day VWAP of the security for that trading day and executes a cross trade at the all-day VWAP. Neither buyer or seller is able to rescind the offer based on any events that take place after the market opens.

Investors are reluctant to use an all-day VWAP cross trade, however, because they are locked out of the market for the entire trading day. Consequently, even if the price of a security changes dramatically during the course of the day, the investor is committed to execute the cross trade at the end of the day. It remains challenging for investors to trade large quantities of securities without the current disadvantages.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF EMBODIMENTS

The inventors have identified the need to create a new way for investors to cross trade securities. The inventors feel that the market will accept a cross trading process which does not require investors to hold the security for an entire trading day and uses a market driven settlement price which is unaffected by the trade itself.

It can be appreciated by those skilled in the art that embodiments of the methods and systems described herein provide many benefits. The embodiments allow investors to anonymously cross trade securities at a market driven settlement price without holding the security throughout the trading day. The embodiments also allow investors to make offers for cross trades in the middle of the trading day and have those cross trades executed in the same day. As a result, investors can achieve a higher degree of liquidity while maintaining their anonymity and being able to execute cross trades within a short period of time.

In various embodiments, investors commit to cross trade a security without knowing the settlement price. The investors commit, during a first time window, to make a cross trade at the volume weighted average price ("VWAP") as calculated during a second time window. After the investors have committed to making the cross trade during the first time window, the volume weighted average price ("VWAP") for a portion of the trading day (the second time window) is calculated for the security. For example, a buyer and a seller may agree at 9:39 a.m. (during the first time window) that they will cross trade 50 shares of IBM at the VWAP to be calculated from 9:45 a.m. and 9:50 a.m. (the second time window). After 9:50 a.m., the VWAP for the second time window is calculated, the cross trade is executed and the trade is reported to the exchange on which the security is traded.

For example, the VWAP for shares of IBM during a time window which starts at 9:45 a.m. and ends at 9:50 a.m. is equal to the sum of the purchase price of each share of IBM traded during this time window divided by the total number of shares traded during this time window. As used herein, a time window is the period of time between two discrete moments. If, for example, in the time window between 9:45 a.m. and 9:50 a.m., 100 shares of IBM were traded at $20/share and 200 shares of IBM were traded at $35/share then the VWAP for IBM during this time window is=(($20*100)+($35*200))/(100 shares+200 shares)=$30.

As used herein, a trade is "reported" to the exchange on which it is traded when the exchange is informed of the volume and settlement price of the trade. The exchange is not informed about the identities of the purchaser and seller so that their anonymity can be maintained.

Figure 1:
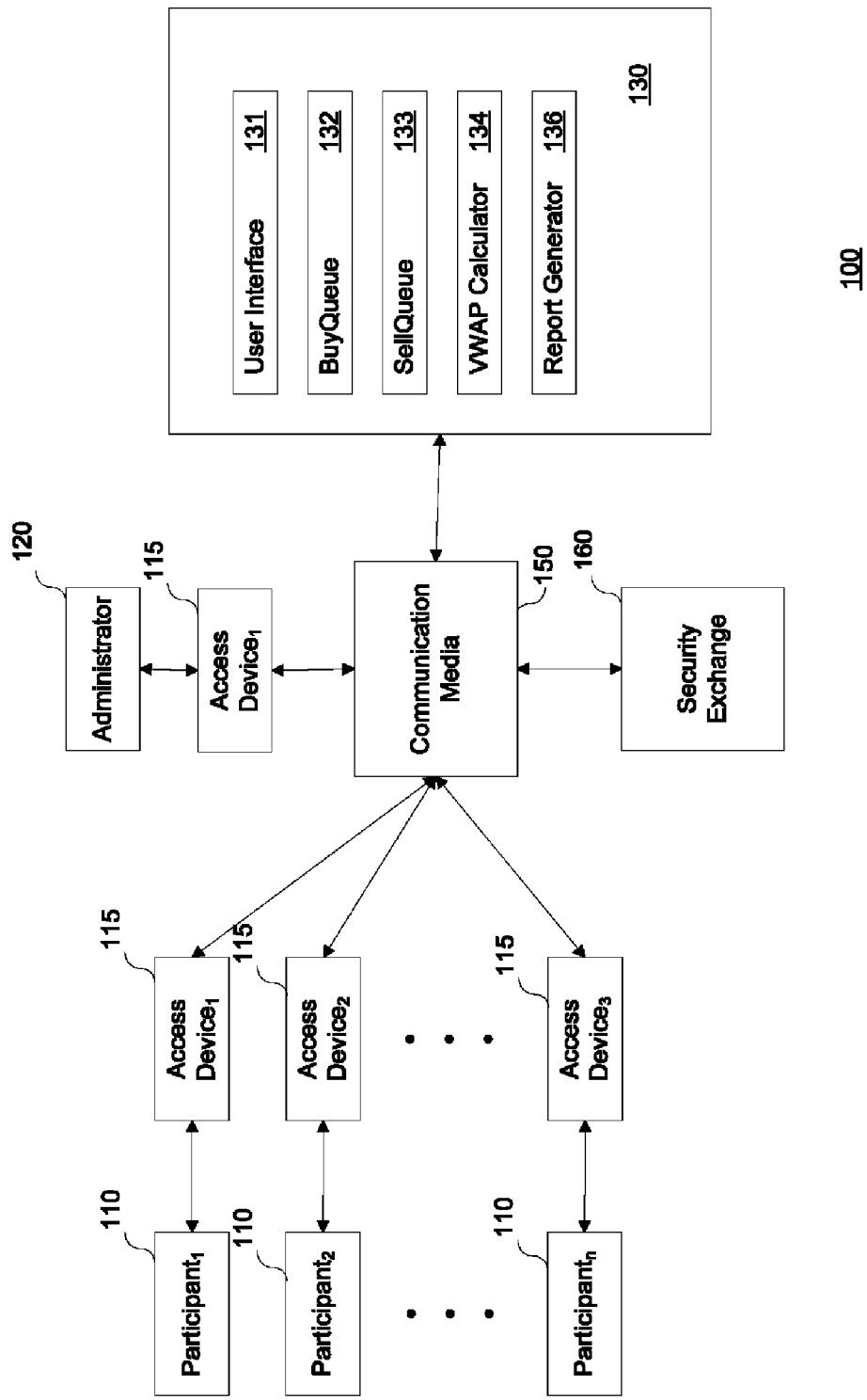
FIG. 1 shows an example of a cross trading system according to embodiments of the invention.

FIG. 1 illustrates an example of a system architecture according to various embodiments of the invention. Cross trading system 130 may include a user interface 131, a BuyQueue 132, a SellQueue 133, a VWAP Calculator 134, and a report generator 136. In various embodiments, cross trading system 130 may be implemented on, for example, a web-based server or another suitable server or computer system. In various embodiments, user interface 131, BuyQueue 132, SellQueue 133, VWAP Calculator 134, and report generator 136 may be software programs, for example, or other applications or devices that execute programs in association with cross trading system 130. User interface 131, BuyQueue 132, SellQueue 133, VWAP calculator 134, and report generator 136 may be programmed in any of a variety of suitable programming languages, such as C++, C, Java, and/or a variety of other kinds of software programming languages that may be applied to create instructions in accordance with embodiments of the invention.

In addition, in certain embodiments, user interface 131 can be configured to allow administrator 120 to set the duration of one or more time windows for a security to be calculated periodically based on a formula. For example, the duration of the second time window can be calculated daily as a function of the previous trading day's volume. Administrator 120 can set the duration of the second time window for IBM to the average period of time during which 80,000 shares of IBM were traded on the previous trading day. If there were 8,000,000 shares traded on the previous trading day, there would be 100 time windows (8,000,000/80,000) during the current trading day. There are 390 minutes in a trading day (from 9:30 a.m. to 4:00 p.m.), so the second time window would last for 3.9 minutes.

In various embodiments, each time cross trading system 130 accepts, for example, an offer to buy a security from a participant 110, the offer is added to BuyQueue 132. Similarly, SellQueue 133 records each offer to sell a security accepted from participants 110. BuyQueue 132 and SellQueue 133 are data structures stored in computer-readable media that record the buy offers and sell offers for each security during the first time window on a first-in-first-out basis.

In various embodiments, VWAP calculator 134 can be configured to calculate the volume weighted average price for each security that can be cross traded in the manner described above.

In various embodiments, report generator 136 can be configured to convert information into one or more formats so that participants 110 can be notified. For example, report generator 136 can format the information as text so that participants 110 can be notified by a text message.

Figure 2:
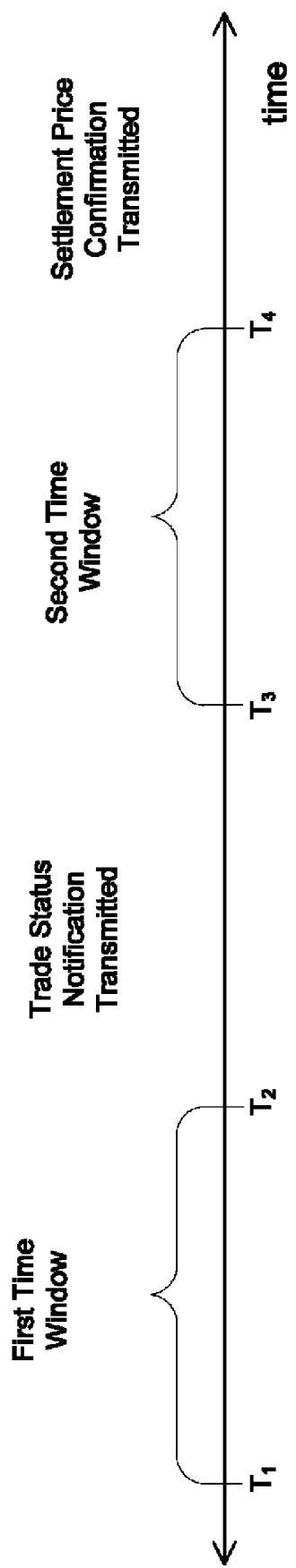
FIG. 2 shows a timeline for a cross trading system according to embodiments of the invention.
Figure 3A:
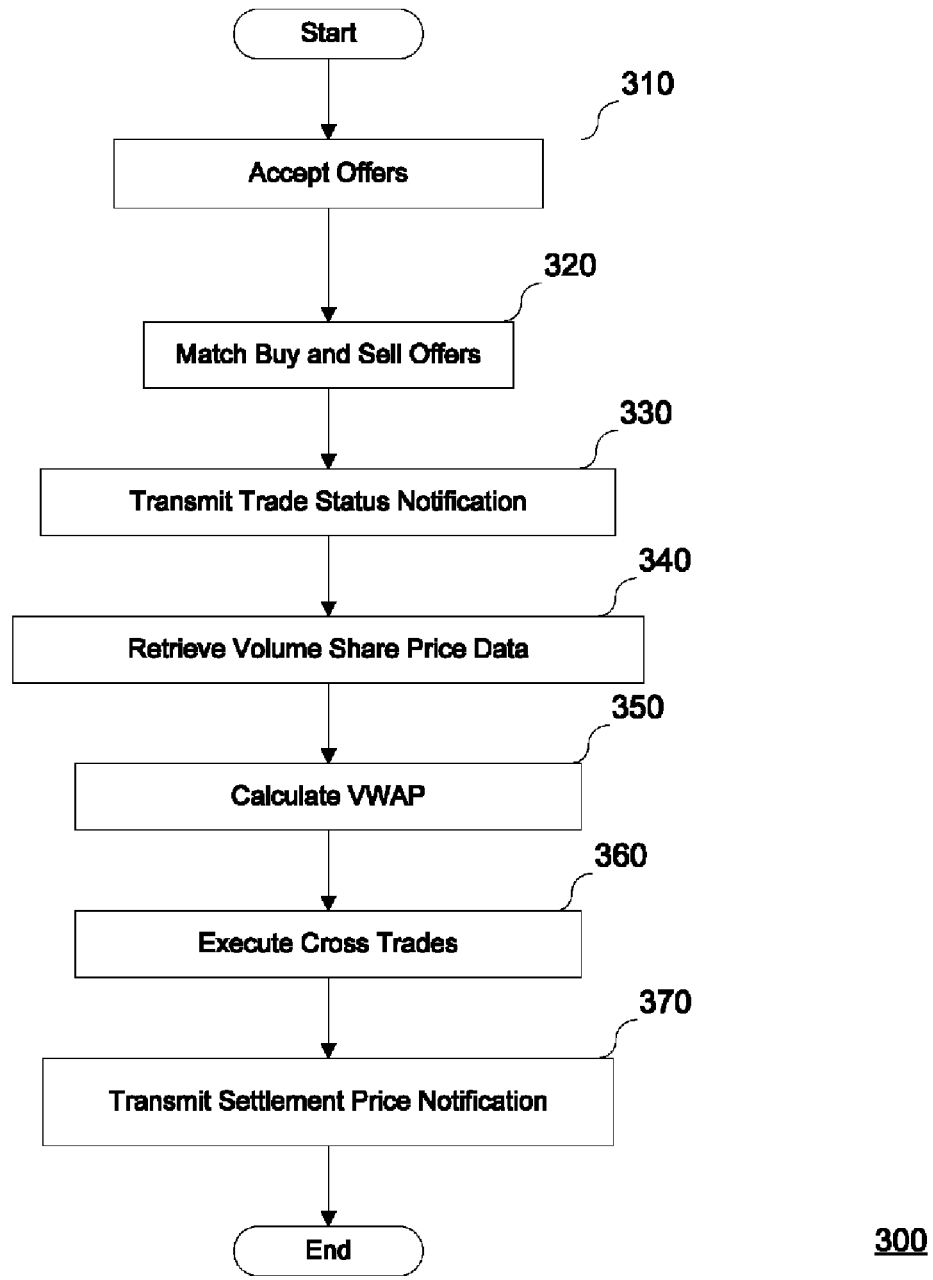
FIG. 3a shows flow chart illustrating an example of a method for trading according to embodiments of the invention.

With reference to FIGS. 2 and 3a, timeline and process flow examples of various embodiments of the invention are illustrated. At step 310, cross trading system 130 accepts offers. Cross trading system 130 may be configured to accept an offer if the participant 110 and security are both eligible. A participant 110 is an eligible participant if the participant 110 is on a list of eligible participants maintained by administrator 120. A security is eligible if it is on a list of eligible securities maintained by administrator 120. When an offer is accepted, it is added to BuyQueue 132 or SellQueue 133, as appropriate.

In various embodiments, cross trading system 130 may be configured to accept offers during the first time window which starts at $T_1$ and ends at $T_2$. At step 320, after the first time window ends (e.g. after $T_2$), cross trading system 130 can match the offers in BuyQueue 132 and SellQueue 133 in the order in which they were received. It can be appreciated that the number of shares that will be cross traded is the lesser of the number of shares in BuyQueue 132 and SellQueue 133.

At step 330, after the buy offers and sell offers have been matched, report generator 136 transmits a trade status notification to each participant 110 that cross trading system 130 accepted an offer from during the first time window in step 310. The trade status notification indicates how many shares, if any, of the participant's offer will be cross traded during the second time window. Both steps 320 and 330 take place between $T_2$ and $T_3$.

In various embodiments, user interface 131 can be configured to allow each participant 110 to choose how cross trading system 130 transmits trade status notifications. For example, participant 110 can choose to receive trade status notifications by, for example, one or more of e-mail, text message, fax, or telephone call or by having the information displayed in a graphical user interface. In an embodiment, cross trading system 130 can be configured to transmit the trade status notification using, for example, the same communication media 150 that participant 110 used to transmit the offer. For example, if participant 110 submits an order using a text message, cross trading system 130 may automatically send the trade status notification by text message.

At step 340, after $T_4$, cross trading system 130 retrieves the volume and settlement price data from security exchange 160 for the security for the second time window (from $T_3$ to $T_4$).

At step 350, VWAP calculator 134 calculates the VWAP for the second time window. As described above, the VWAP is the average price at which each share was traded during the second time window.

At step 360, cross trading system 130 executes the cross trades for those shares that were matched in step 320. It can be appreciated that part of the execution of the cross trades described in step 360 is reporting the trades to security exchange 160 as well as complying with all regulatory requirements.

At step 370, cross trading system 130 transmits a settlement price notification to participants 110 for whom trades were executed at step 360. As used herein, a settlement price notification is a notification transmitted to a participant 110 which contains the settlement price (i.e. VWAP) at which the trade was executed in step 360. It can be appreciated that the settlement price notification is only sent to those participants 110 for whom offers were matched at step 320. In various embodiments, cross trading system 130 can transmit the settlement price notification by, for example, one or more of e-mail, text message, fax, or telephone call or by having the information displayed in a graphical user interface.

Figure 4:
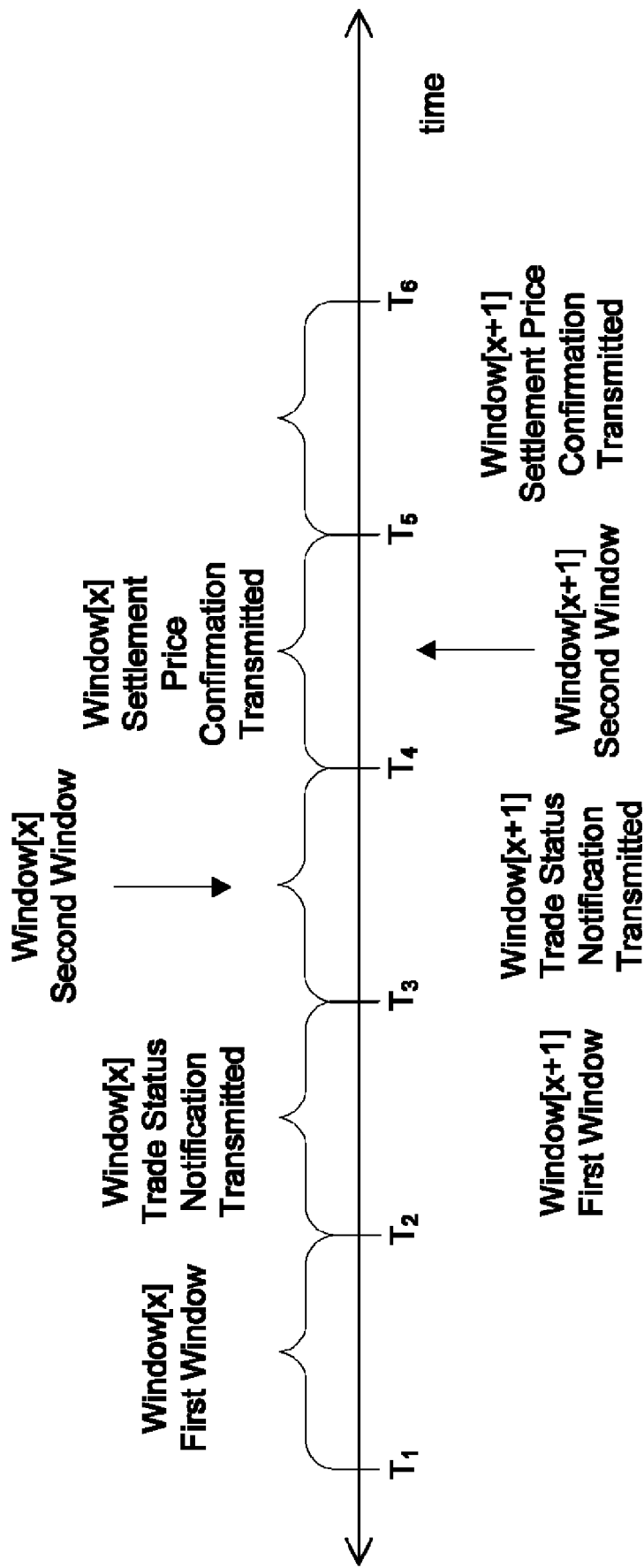
FIG. 4 shows a timeline for a cross trading system according to embodiments of the invention; and, FIG. 5 shows a timeline for a cross trading system according to embodiments of the invention.

With reference to FIG. 4, in various embodiments, cross trading system 130 described above can execute the process flow example illustrated in FIG. 2 such that, for each eligible security, the process described above is repeated throughout the trading day.

For example, Window[x] represents the second time window for each iteration of the process described above. Window[0], the first iteration of the trading day, begins at 9:30 a.m. (i.e. $T_3$). If the duration of the second time window for a security is 5 minutes, then there are 78 iterations over the course of the trading day. Window[0] starts at 9:30 a.m. and ends at 9:35 a.m. Window[1] (i.e. Window[x+1]) starts at 9:35 a.m. and ends at 9:40 a.m. The process may be repeated until the final Window[x] of the day, Window[77], which starts at 3:55 p.m. and ends at 4:00 p.m.

In various embodiments, as shown in FIG. 4, Window[x] starts at $T_3$ and ends at $T_4$, then Window[x+1] starts at $T_4$ and ends at $T_5$. Thus, offers are accepted for Window[x] from $T_1$ to $T_2$ and for Window [x+1] from $T_2$ to $T_3$. Window[x] represents the second time window for each iteration of the process described above. Window[0], the first iteration of the trading day, begins at 9:30 a.m. (i.e. $T_3$). Window[1] starts at 9:35 a.m. and ends at 9:40 a.m, . . . , Window[77] starts at 3:55 p.m. and ends at 4:00 p.m. It can be appreciated that $T_1$ and $T_2$ for Window[0] occur before the beginning of the trading day so Window[0] can start at 9:30 a.m.

Referring again to FIG. 2, in various embodiments, the first time window ($T_1$ to $T_2$), the second time window ($T_3$ to $T_4$), and the delay between the first and second time window ($T_2$ to $T_3$) may be of equal duration. For example, if $T_1$ is 9:30 a.m. and the duration of the time windows is 5 minutes, then $T_2$ is 9:35 a.m., $T_3$ is 9:40 a.m., and $T_4$ is 9:45 a.m. As a result, offers to cross trade a security at the volume weighted average price for Window[2] (e.g., from 9:40 a.m. to 9:45 a.m.) are accepted from 9:30 a.m. to 9:35 a.m. Thus, participants 110 would receive the trade status notification informing them of how many shares will be traded between 9:35 a.m. and 9:40 a.m.

Figure 5:
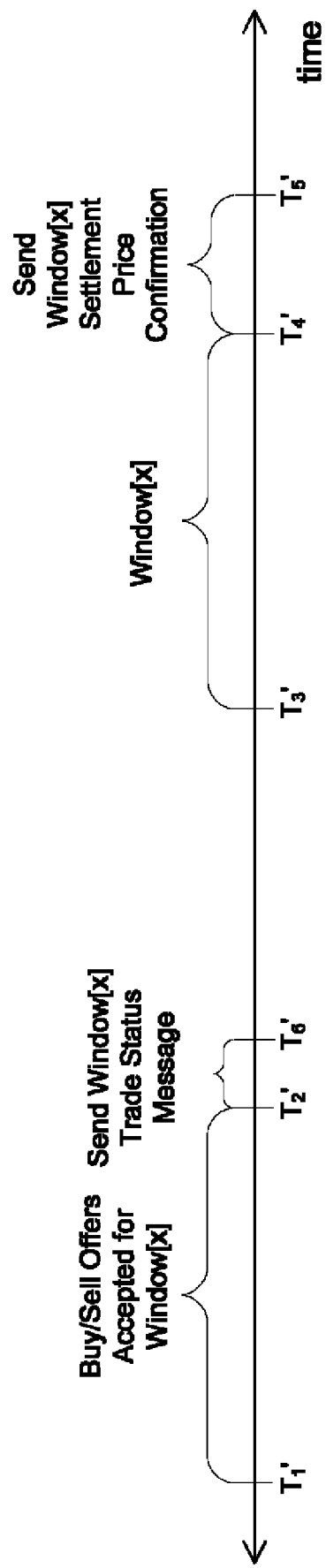

In various embodiments, as shown in FIG. 5, the Window [x] trade status notification must be transmitted within a third time window. This third time window, from $T_2'$ to $T_6'$, lasts for a portion of the delay between $T_2'$ to $T_3'$. For example, cross trading system 130 can be configured so that the duration of the third time window is, for example, 30 seconds. It can be appreciated that if participants 110 know, for example, that the offer was not accepted, alternative arrangements can be made such as, for example, re-submitting the offer for Window[x+1] or publicly offering the shares.

In various embodiments, cross trading system 130 can be configured such that the total duration of the first time window and the third time window is equal to the duration of the second time window. Referring to FIG. 5, the length of time between $T_1'$ and $T_6'$ may be equal to the duration of the second time window (i.e. $T_3'$ to $T_4'$). For example, if Window[2] starts at 9:40:00 a.m. ($T_3'$) and lasts for 5 minutes ($T_4'$=9:45:00 a.m.), then cross trading system 130 can be configured so that the first time window, during which offers are accepted, lasts for 4½ minutes ($T_1'$=9:30:00 a.m.; $T_2'$=9:34:30 a.m.) and the third time window, for transmitting the Window[2] trade status notification, lasts for 30 seconds ($T_2'$=9:34:30 a.m.; $T_6'$=9:35:00 a.m.).

In various embodiments, cross trading system 130 can be configured such that the delay between the first time window and the second time window is longer than the duration of the first and second time windows. Referring to FIG. 5, the duration of the time window during which offers are accepted ($T_1'$ to $T_2'$) may be equal to the duration of Window[x] ($T_3'$ to $T_4'$). Consequently, the time window for accepting offers is offset from Window[x]. For example, if Window[2] starts at 9:40:00 a.m. ($T_3'$), and lasts for 5 minutes ($T_4'$=9:45:00 a.m.), offers can be accepted for Window[2] from 9:29:30 a.m. ($T_1'$) to 9:34:30 a.m. ($T_2'$). Cross trading system 130 transmits the Window[x] trade status notification between 9:34:30 a.m. ($T_2'$) and 9:35:00 a.m. ($T_6'$). The time window for accepting offers for Window[3] begins at 9:34:30 a.m. and lasts for the same duration as Window[x].

In various embodiments, cross trading system 130 can be configured to allow participants 110 to cancel offers during the first time window. Cross trading system 130 can also be configured to allow administrator 120 to specify a number of cancellations that will result in a participant 110 being banned from the system. Administrator 120 can specify both the first period of time during which the specified number of cancellations must take place as well as a second period of time for which participant 110 will be banned.

In various embodiments, cross trading system 130 can be operatively associated with communication media 150 that allows participants 110 and/or administrator 120 to communicate with cross trading system 130 using access devices 115. Each participant 110 may be any type of investor including, for example, an individual, a corporation, a partnership, or an institutional investor such as, for example, an investment bank or a hedge fund. Administrator 120 may be any individual who is given administrative access to cross trading system 130 in order to perform the administrative functions described below. Examples of access devices 115 include, without limitation, computer systems (e.g., notebooks), phones (e.g., wireless phones), fax, and personal data assistants (PDAs). Examples of communication media 150 include, without limitation, wireless networks, wireline networks, and/or a variety of networked media (e.g., intranets or the Internet).

In various embodiments, user interface 131 can be configured to allow participants 110 and/or administrator 120 to communicate with cross trading system 130 using, for example, one or more of a web-based graphical user interface, e-mail messages, text messages, telephone calls, and/or faxes. For example, a participant 110 may employ a PDA as his access device 115 and submit an offer by sending an e-mail.

In various embodiments, user interface 131 can be configured to allow administrator 120 to perform administrative functions that are unavailable to participants 110. These administrative functions include, for example, adding and removing securities from a list of securities that are eligible to be cross traded, adding and removing investors from a list of eligible participants, changing the duration of one or more time windows and/or changing the delay between time windows. For example, using user interface 131, administrator 120 may set the duration of the second time window for IBM to 5 minutes and later change the duration of the second time window for IBM to 10 minutes.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A non-transitory computer-readable memory medium with an executable program stored thereon, wherein the program instructs a microprocessor to perform the following steps for facilitating cross trades of a security at the volume weighted average price calculated during a window of time:
    (a) accepting, with a user interface, from at least one participant offers to buy and offers to sell a security during a first time window;
    (b) matching, with a cross trade application, the offers to buy the security with the offers to sell the security between the first time window and a second time window, and executing, with the cross trade application, cross trades of the matched offers after the second time window, wherein the second time window is less than one trading day and begins after the first time window ends, and wherein the duration of the second time window is a function of a past trading volume of the security;
    (c) calculating, with a volume weighted average price calculator, the settlement price of a cross trade, wherein the settlement price is the volume weighted average price of trades executed for the security during the second time window; and
    (d) generating, with a report generator, a first report between the first time window and the second time window and a second report after the second time window, wherein the first report indicates how many shares of an offer to buy the security or an offer to sell the security were matched, and wherein the second report indicates the settlement price at which the cross trade was executed.

2. The computer-readable memory medium of claim 1, wherein the matching, with the cross trade application, the offers to buy the security with the offers to sell the security is on a first in, first matched basis.

3. The computer-readable memory medium of claim 1, wherein the duration of at least one of the time windows is fixed.

4. The computer-readable memory medium of claim 1, wherein the second time window begins at the start of the trading day.

5. The computer-readable memory medium of claim 4, wherein the accepting, with the user interface, offers occurs before the start of the trading day.

6. The computer-readable memory medium of claim 1, wherein the duration of at least one of the time windows is a function of the previous trading day's trading volume of the security.

7. The computer-readable memory medium of claim 1, wherein the steps further comprise accepting, with the user interface, changes to the duration of at least one of the time windows.

8. The computer-readable memory medium of claim 1, wherein the steps further comprise accepting, with the user interface, changes to the function used to calculate the duration of at least one of the time windows.

9. The computer-readable memory medium of claim 1, wherein the second time window does not begin until the end of a third time window and the third time window does not begin until the end of the first time window.

10. The computer-readable memory medium of claim 9, wherein the steps further comprise accepting, with the user interface, changes to the duration of the third time window.

11. The computer-readable memory medium of claim 9, wherein the steps further comprise:
    (e) generating, with report generator, a first report during the third time window and a second report after the second time window, wherein the first report indicates how many shares of an offer to buy the security or an offer to sell the security will be cross traded at the price calculated by the volume weighted average price calculator, and wherein the second report indicates the settlement price at which the cross trade was executed.

12. The computer-readable memory medium of claim 1, wherein the steps further comprise accepting, with the user interface, offer cancellations during the first time window.

13. The computer-readable memory medium of claim 12, wherein the steps further comprise banning, with the cross trading application, a participant who cancels a specified number of offers during a first specified period of time for a second specified period of time.

14. The computer-readable memory medium of claim 13, wherein the steps further comprise accepting, with the user interface, changes to the specified number of cancellations necessary for a participant to be banned, the duration of the first specified period of time and/or the duration of the second specified period of time.

* * * * *